United States Patent
Nair et al.

(10) Patent No.: US 11,966,958 B2
(45) Date of Patent: Apr. 23, 2024

(54) CONFIGURATION SYSTEM FOR CUSTOM AND PRE-BUILT PRODUCTS

(71) Applicant: Dell Products L.P., Round Rock, TX (US)

(72) Inventors: Harikrishnan Gopalakrishnan Nair, Cedar Park, TX (US); Anshul Kumar, Round Rock, TX (US); Shanil Cheriya Nalakath, Austin, TX (US); Suman Shrestha, Round Rock, TX (US); Prashanth Srinivasan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 60 days.

(21) Appl. No.: 17/647,649

(22) Filed: Jan. 11, 2022

(65) Prior Publication Data

US 2023/0222556 A1   Jul. 13, 2023

(51) Int. Cl.
*G06Q 30/00* (2023.01)
*G06F 18/22* (2023.01)
*G06Q 30/0601* (2023.01)

(52) U.S. Cl.
CPC ......... *G06Q 30/0621* (2013.01); *G06F 18/22* (2023.01); *G06Q 30/0627* (2013.01); *G06Q 30/0629* (2013.01); *G06Q 30/0641* (2013.01)

(58) Field of Classification Search
CPC .................................................... G06Q 30/00
See application file for complete search history.

(56) References Cited

U.S. PATENT DOCUMENTS

| | | | |
|---|---|---|---|
| 7,035,815 B1* | 4/2006 | Henson | G06Q 30/06 705/26.7 |
| 10,313,457 B2* | 6/2019 | Kabiljo | G06N 20/00 |
| 10,909,144 B1* | 2/2021 | Dutta | G06F 16/367 |
| 2019/0236672 A1* | 8/2019 | Coldwell | G06Q 30/0621 |
| 2020/0273083 A1* | 8/2020 | Motwani | G06Q 30/0629 |

OTHER PUBLICATIONS

Newegg, Newegg offers on-demand assembly of custom PCs, Businesswire, dated Jul. 7, 2021. (Year: 2021).*

* cited by examiner

*Primary Examiner* — Mark A Fadok
(74) *Attorney, Agent, or Firm* — DALY, CROWLEY, MOFFORD & DURKEE LLP

(57) ABSTRACT

A method for use in a computing system, comprising: outputting, by the computing system, a product configuration menu that specifies a first set of product components; outputting, by the computing system, information associated with a first product, the first product including the first set of product components; detecting, by the computing system, a user input that specifies a second set of product components, the user input being received via the product configuration menu; selecting, by the computing system, a second product that includes the second set of product components, the second product being selected by performing a search of a product distance data structure to identify a plurality of candidate products that include the second set of product components, obtaining a respective product distance score for the first product and each of the plurality of candidate products, and selecting one of the candidate products as the second product.

18 Claims, 11 Drawing Sheets

CONFIGURATION SYSTEM FOR CUSTOM AND PRE-BUILT PRODUCTS

BACKGROUND

With e-commerce experiences for original equipment manufacturers (OEMs), to improve the prospects of a sale, it is desirable to maintain pre-built inventory to ensure short and predictable ship dates. At the same time, to ensure all potential customer requirements can be satisfied, it is also necessary to support full custom builds with longer and unpredictable ship dates. For this reason, OEMs normally offer pre-built and custom products to their customers. However, in the e-commerce context, it may be difficult for customers to distinguish between different pre-built options, between different custom-built options, and between custom and pre-built options.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided for use in a computing system, comprising: outputting, by the computing system, a product configuration menu that specifies a first set of product components; outputting, by the computing system, information associated with a first product, the first product including the first set of product components; detecting, by the computing system, a user input that specifies a second set of product components, the user input being received via the product configuration menu, the user input replacing at least one of the product components in the first set with a different product component; selecting, by the computing system, a second product that includes the second set of product components, the second product being selected by performing a search of a product distance data structure to identify a plurality of candidate products that include the second set of product components, obtaining a respective product distance score for the first product and each of the plurality of candidate products, and selecting one of the candidate products as the second product based on the respective product distance scores; and outputting, by the computing system, information associated with the second product.

According to aspects of the disclosure, a system is provided comprising: a memory; and one or more processors that are operatively coupled to the memory, the one or more processors being configured to perform the operations of: outputting a product configuration menu that specifies a first set of product components; outputting information associated with a first product, the first product including the first set of product components; detecting a user input that specifies a second set of product components, the user input being received via the product configuration menu, the user input replacing at least one of the product components in the first set with a different product component; selecting a second product that includes the second set of product components, the second product being selected by performing a search of a product distance data structure to identify a plurality of candidate products that include the second set of product components, obtaining a respective product distance score for the first product and each of the plurality of candidate products, and selecting one of the candidate products as the second product based on the respective product distance scores; and outputting information associated with the second product.

According to aspects of the disclosure, a non-transitory computer-readable medium is provided that stores one or more processor-executable instructions, which, when executed by at least one processor, cause the at least one processor to perform the operations of: outputting a product configuration menu that specifies a first set of product components; outputting information associated with a first product, the first product including the first set of product components; detecting a user input that specifies a second set of product components, the user input being received via the product configuration menu, the user input replacing at least one of the product components in the first set with a different product component; selecting a second product that includes the second set of product components, the second product being selected by performing a search of a product distance data structure to identify a plurality of candidate products that include the second set of product components, obtaining a respective product distance score for the first product and each of the plurality of candidate products, and selecting one of the candidate products as the second product based on the respective product distance scores; and outputting information associated with the second product.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
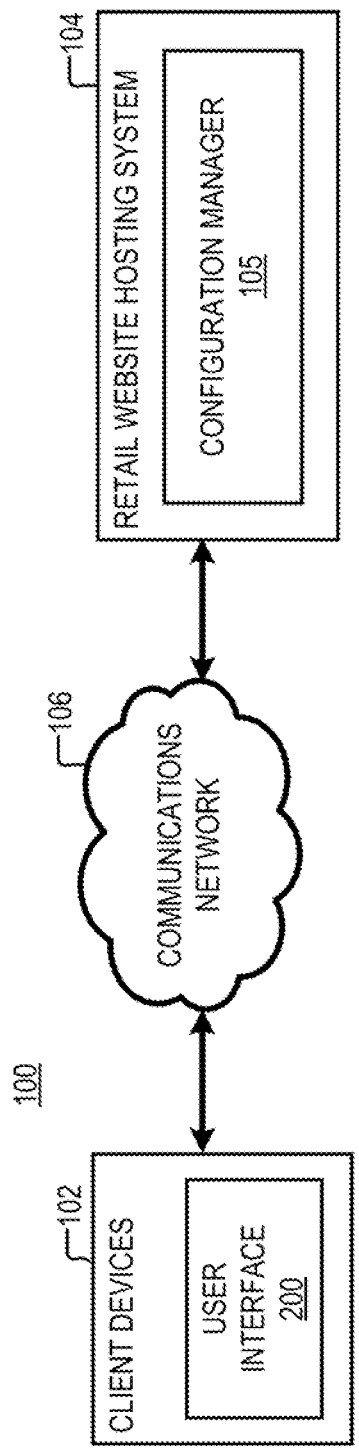
FIG. 1 is a diagram of an example of a system, according to aspects of the disclosure.

FIG. 1 is a diagram of an example of a system 100, according to aspects of the disclosure. As illustrated, the system 100 may include one or more client devices 102 that are coupled to a hosting system 104 via a communications network 106. Each of the client devices 102 may include a smartphone, a desktop computer, a laptop, and/or any other suitable type of computing device. In some implementations, each of the client devices 102 may be a computing device, such as the computing device 900, which is discussed further below with respect to FIG. 9. The hosting system 104 may include one or more computing devices that are configured to host and/or manage a retail website (or another type of website that is used for the placement of orders and/or placement of purchases by retail customers or wholesale customers). The hosting system 104 may include load balancers, frontend servers, backend servers, authentication servers, and/or any other suitable type of computing device. The hosting system 104 may include one or more computing devices, such as the computing device 900, which is discussed further below with respect to FIG. 9. The communications network 106 may include one or more of a local area network (LAN), a wide area network (WAN), the Internet, a 5G cellular network, and/or any other suitable type of communications network. The hosting system 104 is arranged to provide a product configuration service. According to the present example, the hosting system 104 includes a configuration manager 105, which performs the configuration service. The operation of the configuration manager 105 is discussed further below with respect to FIGS. 2-8D.

Figure 2:
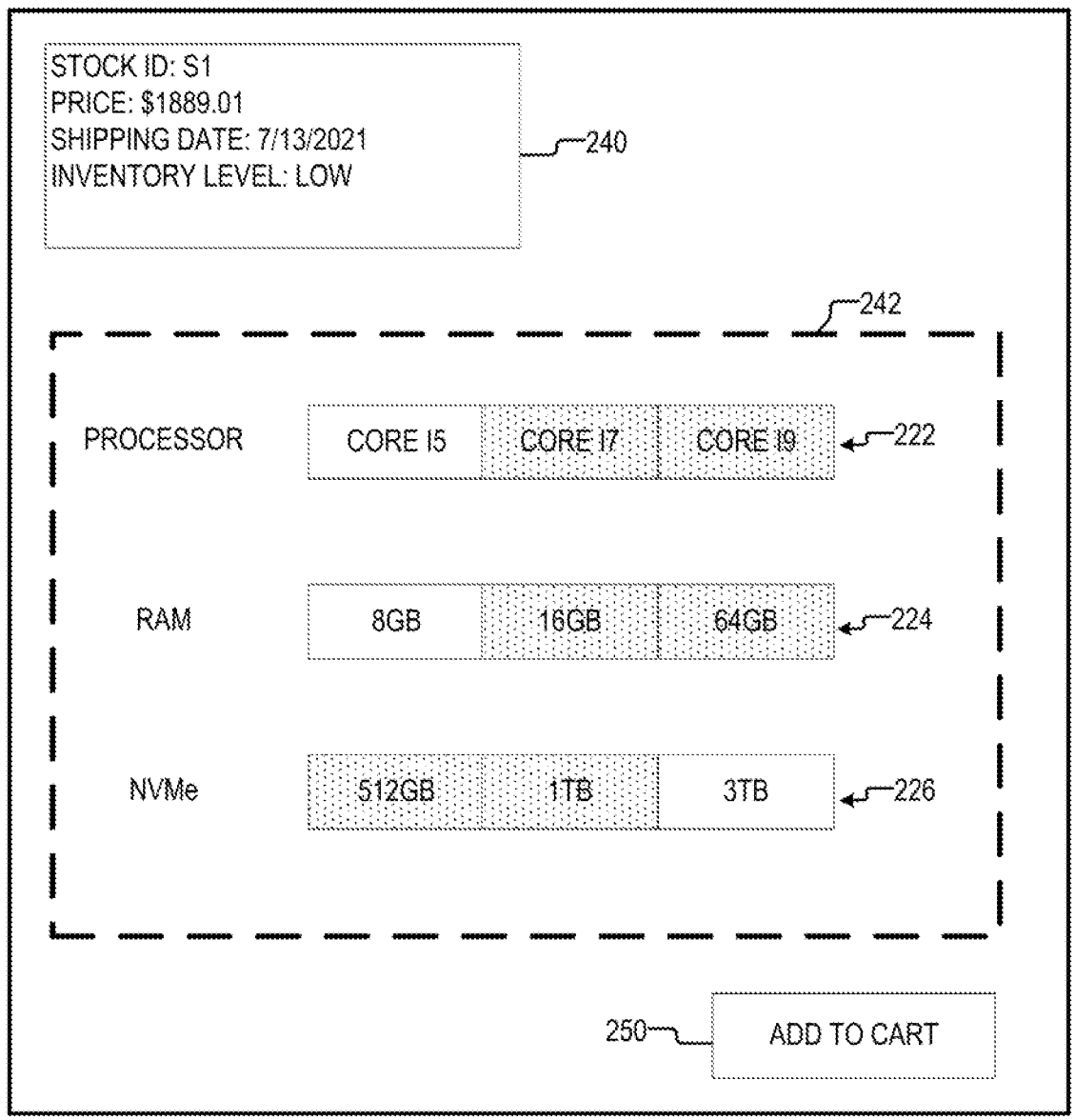
FIG. 2 is a diagram of an example of a user interface, according to aspects of the disclosure.

FIG. 2 illustrates an example of an interface 200 when the interface 200 is in a first state. The interface 200 may include a graphical user interface that is displayed at a given one of the client devices 102, and which is provided to the client device, at least in part, by the configuration manager 105. The interface may include a product configuration menu 242 for selecting a set of product components (e.g., computer components) that need to be included in a product (e.g., a computer system), which a user (e.g., a customer) might purchase. When the interface 200 is in the first state, the menu 242 is configured to select a first set of input components. The first set of components, according to the present example, includes a Core i5 processor, an 8 GB RAM module, and a 3 TB NVMe module.

Figure 3:
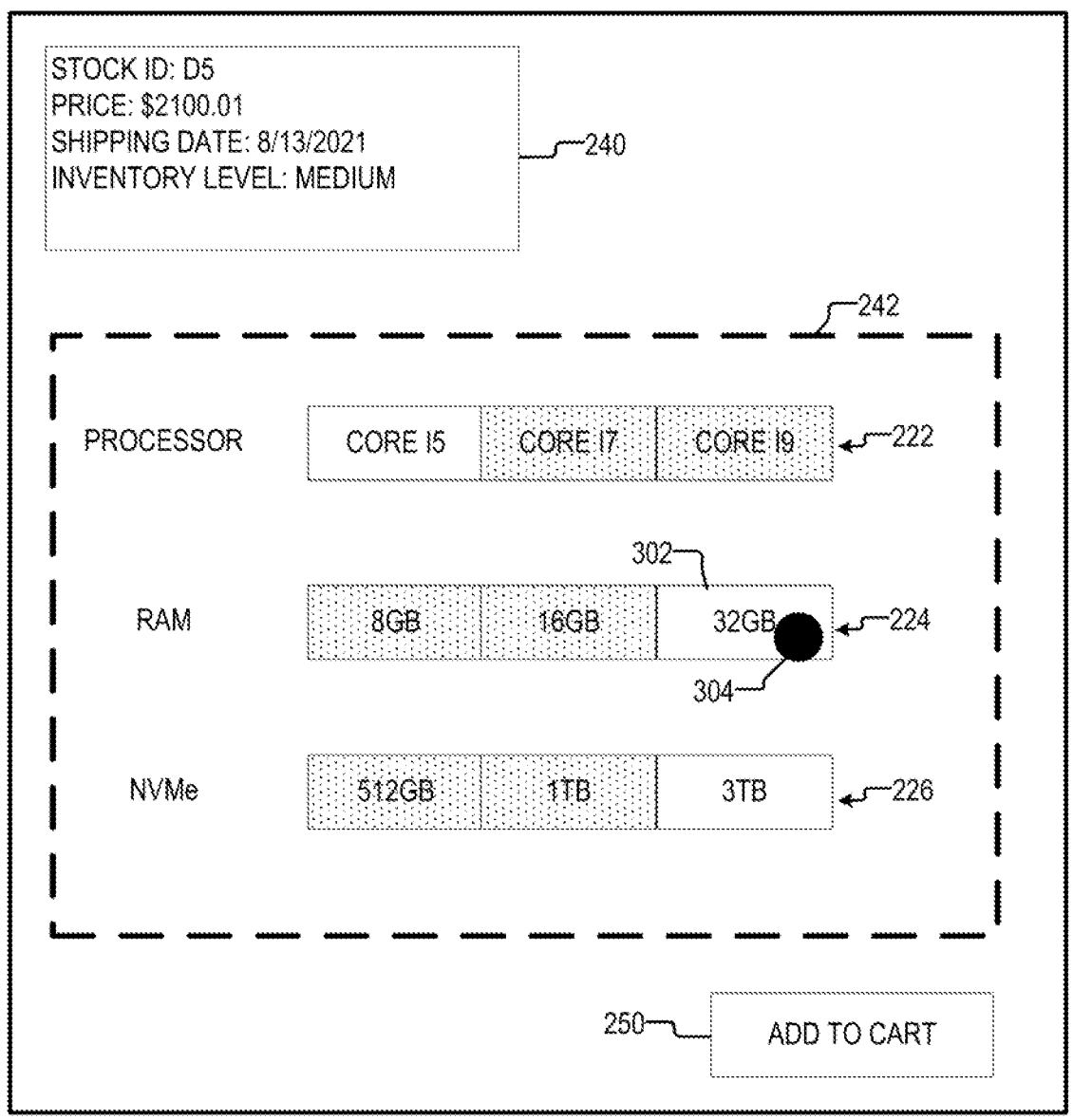
FIG. 3 is a diagram of an example of a user interface, according to aspects of the disclosure.

FIG. 3 illustrates an example of the interface 200 when the interface 200 is in a second state. The interface 200 may be transitioned from the first state to the second state in response to user input 304 that is received at an input component 302 of submenu 224 of the menu 242. The user input 304 substitutes the selection of the 8 GB RAM module with a selection of a 32 GB RAM module. When the interface 200 is in the second state, the menu 242 is configured to select a second set of input components. The second set of components, according to the present example, includes a Core i5 processor, a 32 GB RAM module, and a 3 TB NVMe module.

The interface 200 may include a field 240. The field 240, in FIG. 2, identifies a product S1 that has been selected by the configuration manager 105 in response to the selection of the first set of components by the menu 242. The field 240, in FIG. 3, identifies a product D5 that has been selected by the configuration manager 105 in response to the selection of the second set of components. In other words, product S1, which is identified in field 240 of FIG. 2, is a product that includes the first set of components, and product D5, which is identified in field 240 of FIG. 3, is a product that includes the second set of components.

The configuration manager 105 may update the field 240 automatically, in response to the user input 304. When the user input 304 is detected by the configuration manager 105, the configuration manager 105 may: (i) identify the second set of components that is being selected by the user input 304, (ii) identify one or more products that include the second set of components, (iii) select one of the identified products for presentation to the user, and (iv) refresh (or update) the field 240 to include information about the selected product.

The product D5 may be selected (by the configuration manager 105) for presentation in field 240 out of a plurality of products that include the second set of components. The product D5 may be selected based on the product D5 having the smallest product distance score (in relation to product S1) among a plurality of candidate products that include the second set of components. As used herein the phrase "product distance score of product A in relation to product B" refers to the product distance score for products A and B (i.e., the product distance between products A and B).

In some aspects, a product distance score for two products, such as products S1 and D5, is a measure of similarity (or difference) between the two products. In some instances, products S1 and D5 may differ in the components selected with the menu 242, as well as in components that are not selectable via the menu 242. For example, product S1 may include one type of network card, and product D5 may include another type of network card. As is discussed further below, in some implementations, the product distance score for products S1 and D5 may account for the differences between the components that make up products S1 and D5, including both the components that are selectable via menu 242 and those components that are not selectable via the menu 242.

In some aspects, two products that include the second set of components (specified in FIG. 3) may or may not include other components that are different, and which are not customizable with the menu 242. For example, two computing systems that include the second set of components may include different network cards. The product distance score for these products (e.g., in relation to the product S1) may account for this type of difference, thereby enabling the configuration manager 105 to measure the extent to which two products are different from one another, despite both of them including the components selected with the menu 242. In other words, the product distance score for these products (e.g., in relation to the product S1) may enable the configuration manager 105 to determine which of the two products is more similar to the product S1.

In some implementations, it may be desirable for field 240 to be updated to identify a product that includes the second set of components, and which is as similar as possible to the product that is currently identified in field 240. In other words, when user input 304 is detected, it may be desirable to display in field 240 a new product that is as similar as possible to the product S1. The similarity between the two products may be one or more of: (i) similarity in terms of components that are part of each of the products, (ii) similarity in terms of cost, (iii) similarity between the products' delivery dates, and/or (iv) similarity in terms of any other characteristic that may be of interest to the user. As is discussed further below, the product distance score for two products may be weighted to account for additional differences, such as differences in price, shipping cost, delivery date, etc.

According to the present disclosure, it has been determined that displaying the "most similar" product in field 240 is advantageous because it increases the likelihood of a sale to the user. When the user is satisfied with product parameters that are presented in field 240, the user may press an "add to cart" button 250. Pressing the button 250 may cause the product that is identified in field 240 to be placed in a shopping cart and subsequently purchased by the user.

Returning to FIGS. 2-3, the field 240 may identify any suitable type of information that is associated with a selected product. Such information may include stock ID, price, shipping date, inventory level, etc. The term "shipping date" as used herein is intended to cover any data item that indicates how long it would take for the user to receive the selected product if the user decides to go on with the purchase (e.g., time until the product is handed off to a shipping company, time the product is expected to spend in transit, etc.). The term "inventory level" may refer to any indication of how readily-available a product is.

The menu 242 may include submenus 222-246. Submenu 222 allows the user to choose from a plurality of different processors that are available for inclusion in a computing system. The submenu 222 may include a plurality of input components (e.g., buttons). Each of the input components may correspond to a different type of processor. The user can select a given one of the available processors by activating (e.g., pressing) the input component that corresponds to the given processor. In the example of FIG. 2, the input component corresponding to a Core-i5™ processor is activated, resulting in the selection of the Core-i5™ processor.

Submenu 224 allows the user to choose from a plurality of different RAM sizes that are available for inclusion in a computing system. The submenu 224 may include a plurality of input components (e.g., buttons). Each of the input components may correspond to a different RAM size. The user can select a given one of the available memory sizes by activating (e.g., pressing) the input component that corresponds to the given RAM size. In the example of FIG. 2, the input component corresponding to 8 GB of memory is activated, resulting in the selection of 8 GB of RAM for inclusion in the custom computing system.

Submenu 226 allows the user to choose from a plurality of different NVMe sizes that are available for inclusion in a computing system. The submenu 226 may include a plurality of input components (e.g., buttons). Each of the input components may correspond to a different type of NVMe size. The user can select a given one of the available NVMe sizes by activating (e.g., pressing) the input component that corresponds to the size. In the example of FIG. 2, the input component corresponding to a 3 TB is activated, resulting in the selection of a 3 TB NVMe module for inclusion in the custom computing system.

Figure 4:
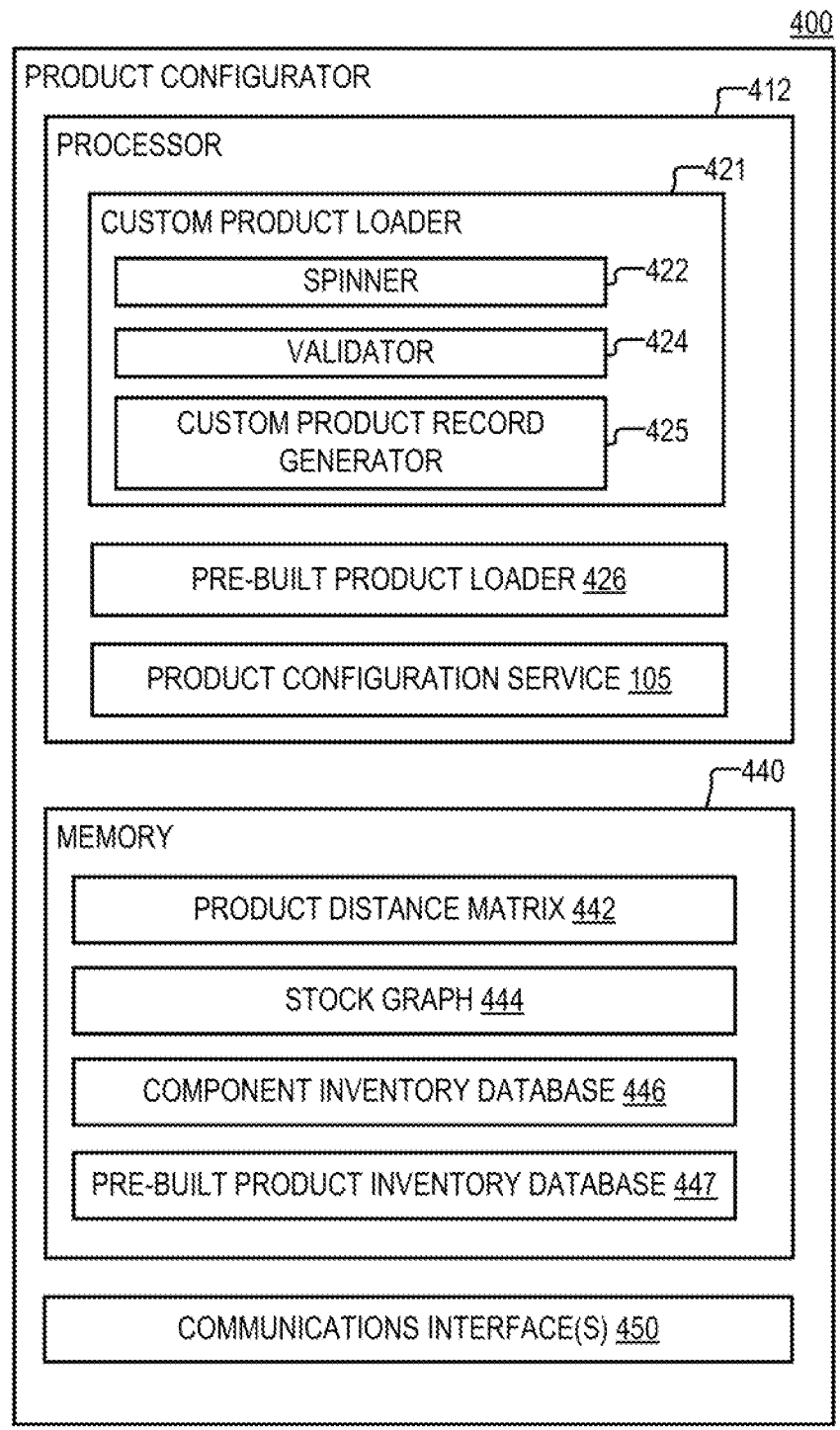
FIG. 4 is a diagram of an example of a product configurator, according to aspects of the disclosure.

FIG. 4 is a diagram of the configuration service 400, according to aspects of the disclosure. The reseller detection system may include a processor 412, a memory 440, and a communications interface 450. The processor 412 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The memory 440 may include any suitable type of volatile and/or non-volatile memory. In some implementations, the memory 440 may include one or more of a random-access memory (RAM), a dynamic random memory (DRAM), a flash memory, a hard drive (HD), a solid-state drive (SSD), a network accessible storage (NAS), and or any other suitable type of memory device. The communications interface 450 may include any suitable type of communications interface, such as one or more Ethernet adapters, one or more Wi-Fi adapters (e.g., 802.1414 adapters), and one or more Long-Term Evolution (LTE) adapters, for example.

The processor 412 may be configured to execute a custom product loader 421, a pre-built loader 426, and the configuration manager 105. The memory 440 may be configured to store a product distance matrix 442, a stock graph 444, a component inventory database 446, and a pre-built product inventory database 447.

The component inventory database 446 may identify all product components that are available in an inventory. Specifically, the component database may identify different sets of components of the same type. For example, the component inventory database 446 may identify the set of all processors that are available in the inventory, the set of all memory modules that are available in the inventory, the set of all hard drives (or NVMes) that are available in the inventory, the set of all motherboards that are available in the inventory, the set of all video cards that are available in the inventory, etc. The pre-built product inventory database 447 may identify a plurality of pre-built products that are available in an inventory. For each of the products, the pre-built product inventory database 447 may include a respective product record, such as the product record 500, which is discussed with respect to FIG. 5.

The pre-built loader 426 may be configured to retrieve product records for pre-built products from the pre-built product inventory database 447 and provide the retrieved product records to the configuration manager 105. The custom product loader 421 may identify a plurality of custom products that can be produced using the product components that are identified by the component inventory database 446. For each of the identified products, the custom product loader 421 may generate a product record and provide the generated product record to the configuration manager 105. Each of the records provided by the loaders 421 and 426 may be the same or similar to the product record 500, which is discussed further below with respect to FIG. 5.

The custom product loader 421 may include a spinner 422, a validator 424, and a custom product record generator 425. The spinner 422 may be configured to determine the Cartesian product of different component sets that are identified in the component inventory database 446. As a result of computing the Cartesian product of the component sets, the spinner 422 may identify a set of different component combinations. Each component combination may include one member from each of the component sets that are identified in the component inventory database. The validator 424 may be configured to remove from the set of component combinations those combinations that include incompatible components. For example, if a component combination includes an AMD™ processor and a motherboard with an INTEL™ socket, the validator 424 may remove this combination from the set of component combinations. The custom product record generator 425 may be configured to obtain from the validator 424 a plurality of component combinations that are considered valid by the validator 424. The custom product record generator 425 may then generate a respective product record for each of the valid component combinations; the generated record may correspond to a product that includes the component combination.

The product distance matrix 442 may include a data structure that identifies pairs of products. For each of the product pairs, the product distance matrix 442 may identify a product distance between the products in the pair. In addition, for each of the product pairs, the product distance matrix 442 may identify the difference between the products in the pair. The product distance matrix 442 may be generated based on the stock graph 444. An example of the product distance matrix 442 is discussed further below with respect to FIG. 6. An example of the stock graph 444 is provided further below with respect to FIG. 7. Throughout the disclosure, the terms "product distance" and "product distance score" are used interchangeably.

Figures 5, 6:
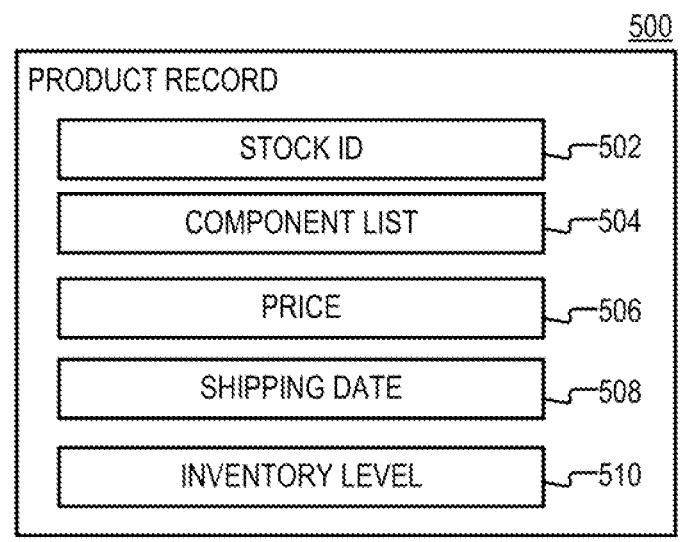
FIG. 5 is a flowchart of an example of a product record, according to aspects of the disclosure.
FIG. 6 is diagram of an example of a product distance matrix, according to aspects of the disclosure.

FIG. 5 is a diagram of an example of a product record 500. The product record may be associated with a custom-built or a pre-built product (hereinafter "associated product"). The product record 500 may include a stock ID 502 that corresponds to the associated product, a list 504 of components that are part of the associated component, an indication 506 of the price of the associated component, an indication 508 of the shipping date of the associated product, and an indication 510 of the inventory level of the associated product.

FIG. 6 illustrates an example of the product distance matrix 442. As illustrated, the product distance matrix 442 may include rows 602-608. Each of the rows 602-608 identifies a different pair of products, an indication of a difference between the products in the pair, and an indication of a product distance between the products in the pair.

Row 602 is associated with products S1 and D5. Row 602 indicates that product D5 includes 32 GB memory module which is not found in product S1. Row 602 further indicates that the product distance score for products S1 and D5 is 0.5. Row 606 implicitly indicates that products S1 and S4 include the same processor and the same NVMe module.

Row 604 is associated with products S1 and D7. Row 604 indicates that product D7 includes the following components that are not found in product S1: a Core i7 processor, a 32 GB RAM module, and a 512 GB ram module. Row 604 further indicates that the product distance score for products S1 and D7 is 0.00.

Row 606 is associated with products S1 and S4. Row 606 indicates that product S4 includes a 32 GB RAM module that is not found in product S1. Row 606 further indicates that the product distance score for products S1 and S4 is 0.5. Row 606 implicitly indicates that products S1 and S4 include the same processor and the same NVMe module.

Row 608 is associated with products S1 and D1. Row 608 indicates that product D1 includes a 32 GB RAM module and a 512 GB NVMe module that are not found in product S1. Row 608 further indicates that the product distance score for products S1 and D1 is 0.2. Row 608 implicitly indicates that products S1 and D1 use the same RAM module.

FIG. 6 is provided for illustrative purposes only. In the example of FIG. 6, the product distance scores are calculated only based on components that are selectable via the menu 242. However, in most practical implementations, the scores will be calculated also based on the presence/absence of components that are not selectable via the menu 242. In such implementations, the third column (from left to right) of the product distance matrix 442 may identify components that are not selectable in the menu, and which are available in one product in a product pair, but not in the other. Although all pairs of products that are identified in the product distance matrix include the product S1, it will be understood that the present disclosure is not limited thereto.

Figure 7:
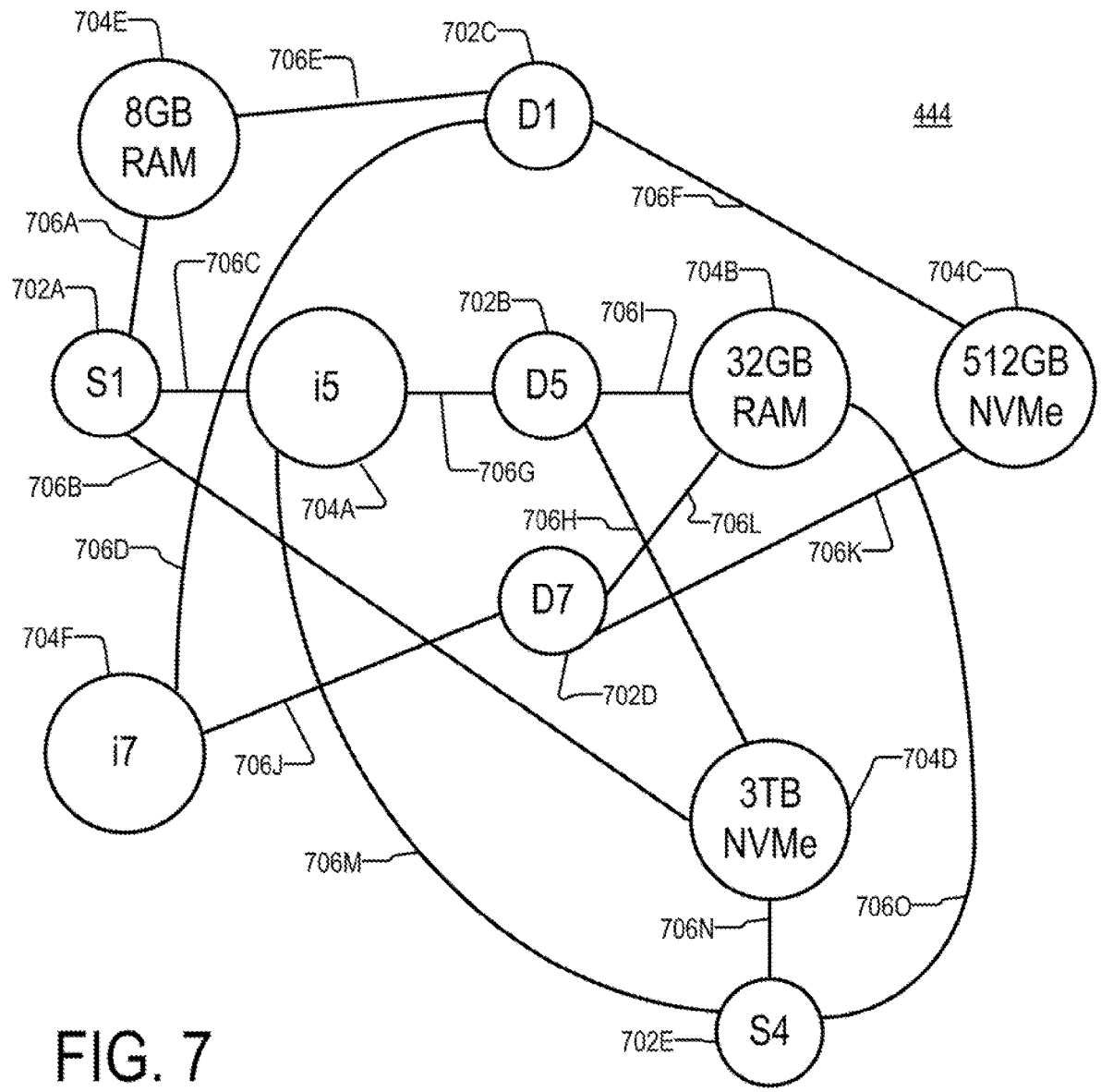
FIG. 7 is a diagram of a stock graph, according to aspects of the disclosure.

FIG. 7 is a diagram of an example of the stock graph 444, according to aspects of the disclosure. As illustrated, the stock graph 444 may include nodes 702A-E and nodes 704A-D that are connected by edges. Each of the nodes 702A-D is associated with a different product. Specifically, node 702A is associated with product S1, node 702B is associated with product D5, node 702C is associated with product D1, node 702D is associated with a product D7, and node 702E is associated with a product S4. Each of nodes 704A-D is associated with a different component. Node 704A is associated with a Core i5 processor. Node 704B is associated with a 32 GB memory module. Node 704C is associated with a 512 GB NVMe module. Node 704D is associated with a 3 TB NVMe module. Node 704E is associated with an 8 GB memory module. And node 704F is associated with a Core i7 processor.

Each of the edges 706 indicates an is-part-of relationship between a product and a product component. When an edge 706 in the stock graph 444 connects a first node corresponding to a particular product and a second node corresponding to a given product component, this is an indication that the given product component is part of the particular product. When no edge 706 in the stock graph 444 connects the first node to the second node, this is an indication that the given product component is not part of the particular product component.

In the example of FIG. 7, edge 706A indicates that product S1 includes the 8 GB memory module. Edge 706B indicates that product S1 includes a 3 TB NVMe storage device. Edge 706C indicates that product S1 includes a Core i5 processor. Edge 706D indicates that product D1 includes a Core i7 processor. Edge 706E indicates that product D1 includes the 8 GB memory module. Edge 706F indicates that product D1 includes the 512 GB NVMe module. Edge 706G indicates that product D5 includes a Core i5 processor. Edge 706H indicates that product D5 includes a 3 TB NVMe module. Edge 706I indicates that product D5 includes a 32 GB memory module. Edge 706J indicates that product D7 includes a core i7 processor. Edge 706K indicates that product D7 includes a 512 GB NVMe module. Edge 706L indicates that product D7 includes a 32 GB memory module. Edge 706M indicates that product S4 includes a Core i5 processor. Edge 706N indicates that product S4 includes a 3 TB NVMe module. And edge 706O indicates that product S4 includes a 32 GB memory module.

Figure 8A:
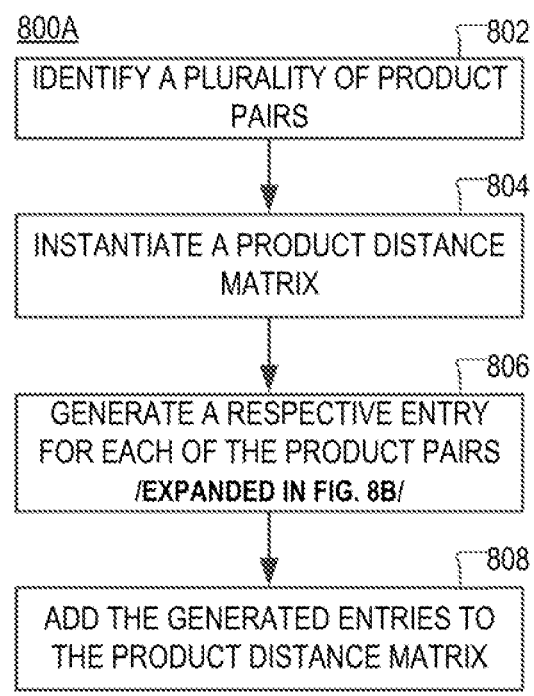
FIG. 8A is a flowchart of an example of a process, according to aspects of the disclosure.

FIG. 8A is a flowchart of an example of a process 800A for generating a product distance matrix. At step 802, the configuration manager 105 identifies a plurality of product pairs. At step 804, the configuration manager 105 instantiates a product distance matrix. The product distance matrix may be the same or similar to the product distance matrix 442, which is discussed with respect to FIGS. 4 and 6. At step 806, the configuration manager 105 generates a respective entry for each of the pairs. Each of the entries may be similar to one of rows 602-608, which are discussed above with respect to FIG. 6. The term "entry," as used herein, may refer to one or more data structures (or a portion of a data structure) that include(s) the information discussed above with respect to any of rows 602-608. Each of the entries may be generated in accordance with a process 800B, which is discussed above with respect to FIG. 8B. At step 808, the configuration manager 105 adds the generated entries to the product distance matrix that is instantiated at step 804. As used throughout the disclosure, the term product distance matrix may refer to one or more data structures that identify the product distances (and/or different components) for a set of product pairs.

Figure 8B:
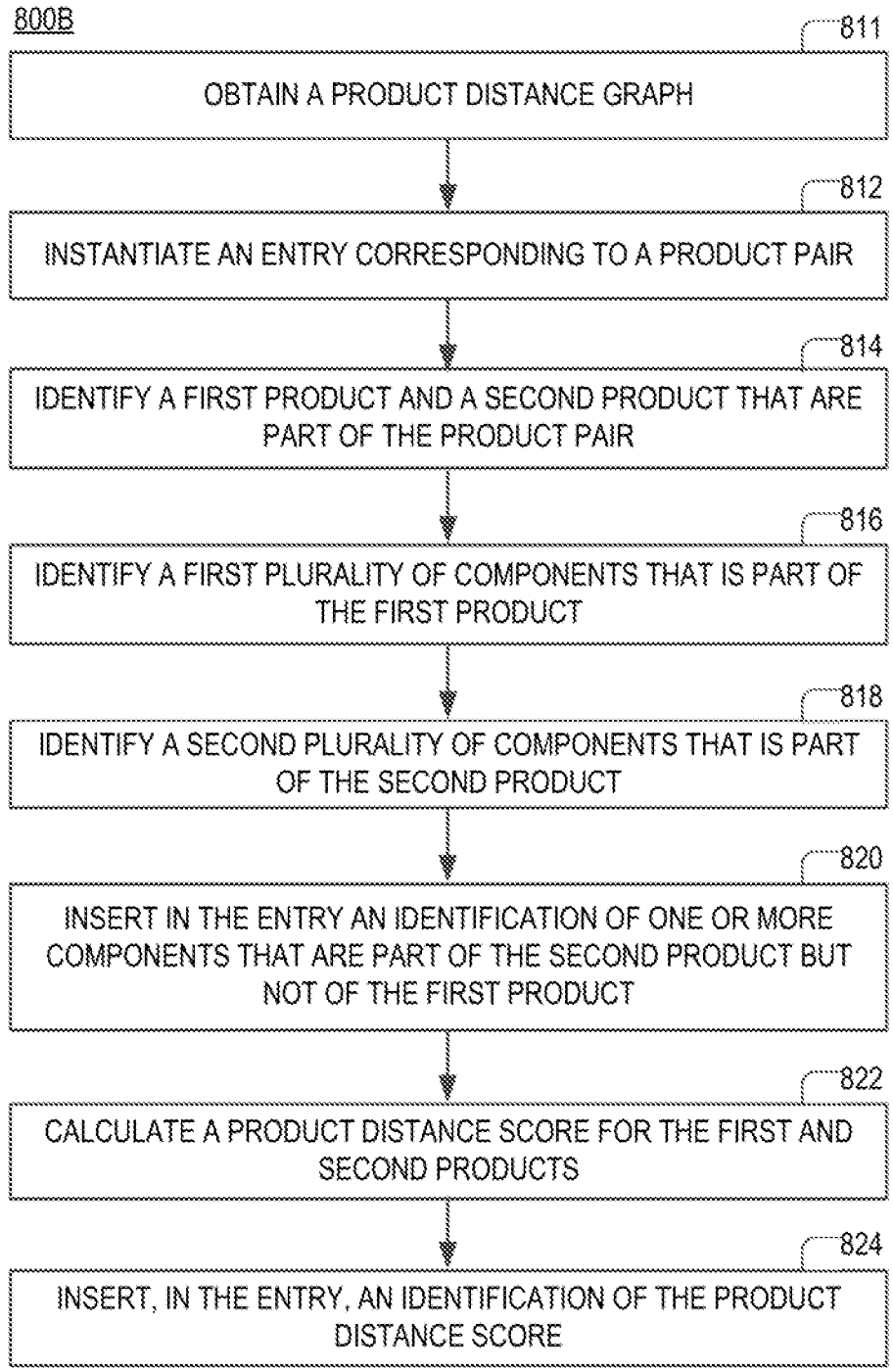
FIG. 8B is a flowchart of an example of a process, according to aspects of the disclosure.

FIG. 8B is a flowchart of an example of a process 800B for generating a product distance matrix entry, as discussed with respect to step 806 of the process 800A. At step 811, the configuration manager 105 obtains a product distance graph. The product distance graph may be the same or similar to the stock graph 444, which is discussed above with respect to FIG. 6. At step 812, the configuration manager 105 instantiates an entry corresponding to a product pair. The pair may be formed of any of the products discussed above (e.g., [S1, D5], [S1, D7], [S1, S4], [S1, D1], [D5, D7], [S4, D7] etc.) According to the present example, the configuration manager instantiates an entry corresponding to products S1 and D5. At step 814, the configuration manager 105 identifies a first product and a second product that are part of the product pair. At step 816, the configuration manager 105 identifies a first plurality of components that is part of the first product. The first plurality of components may be identified based on the product distance graph (obtained at step 811). As noted above, the first plurality of components may (or may not) be a strict superset of the first set of components, which is selected in FIG. 2. At step 818, the configuration manager 105 identifies a second plurality of components that is part of the second product. As noted above, the second plurality of components may (or may not) be a strict superset of the second set of components, which is selected in FIG. 3. The second plurality of components may be identified based on the product distance graph (obtained at step 811). At step 820, the configuration manager 105 inserts into the entry (instantiated at step 812) an identification of one or more components that are part of the second plurality, and which are absent from the first plurality. For example, the configuration manager 105 may insert into the entry an indication of the intersection of the first and second pluralities. At step 822, the configuration manager calculates a product distance score for the first and second products. At step 824, the configuration manager 105 inserts the product distance score into the entry (instantiated at step 812).

The product distance score for the first product and the second product may be the same or similar to any of the product distance scores that are listed in the product distance matrix 442. In some implementations, the product distance score for the first product and the second product may include a measure of similarity in the compositions of the first product and the second product, and it may be indicative of the differences between the first plurality of components and the second plurality of components. In some implementations, the product distance score (calculated at step 822) may be proportional to a count of components in the second plurality, which are not part of the first plurality. Additionally or alternatively, in some implementations, the product distance score (calculated at step 822) may be proportional to a count of components in the first plurality, which are not part of the second plurality. Additionally, in some implementations, the product distance score may be weighted based on a difference in price between the first component and the second component. Additionally, in some implementations, the product distance score may be weighted based on a difference in shipping delay between the first component and the second component.

In some implementations, the product distance score (calculated at step 802) may be equal to the Jaccard similarity between the first plurality of components (identified at step 816) and the second plurality of components (identified at step 818). In such implementations, the product distance score may be calculated in accordance with equation 1 below:

$$d = \left(\frac{P_1 \cap P_2}{P_1 \cup P_2}\right) \quad (1)$$

where $P_1$ is the first plurality of components, $P_2$ is the second plurality of components, and d is the product distance score.

In some implementations, the product distance score (calculated at step 802) may be weighted based on one or more secondary considerations, as indicated by equation 2 below:

$$d = w\left(\frac{P_1 \cap P_2}{P_1 \cup P_2}\right) \quad (2)$$

where w is a weight coefficient. In some implementations, the value of the weight coefficient w may be equal (or otherwise based on) to the quotient of the price of the first product and the price of the second product. Additionally or alternatively, in some implementations, the value of weight coefficient w may be equal (or otherwise based on) the quotient between a shipping period for the first product and a shipping period for the second product. Equations 1 and 2 are provided as an example only. The phrase "calculating a product distance score for two products", as used throughout the disclosure, may refer to calculating any measure of similarity between the two products.

Figure 8C:
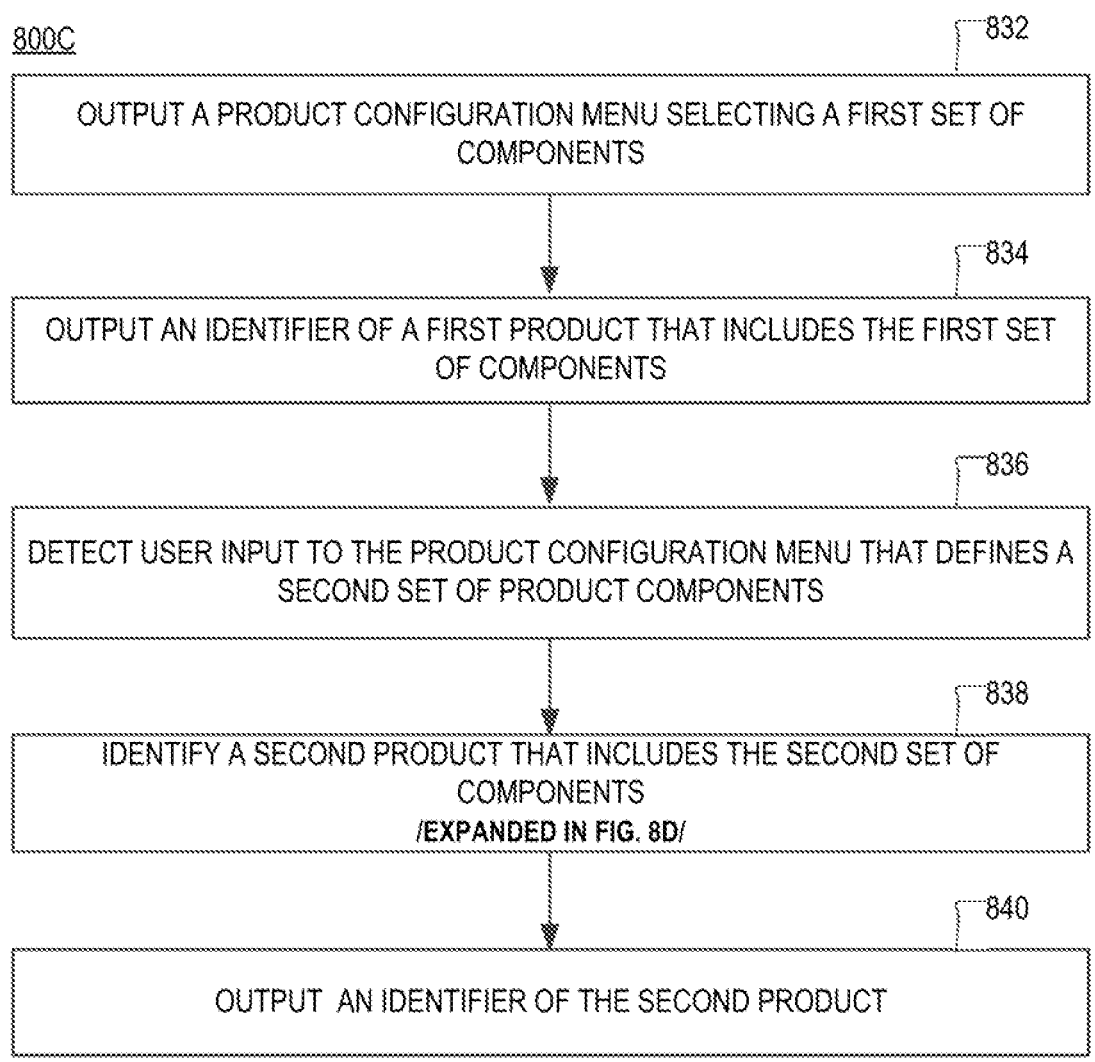
FIG. 8C is a flowchart of an example of a process, according to aspects of the disclosure.

FIG. 8C is a flowchart of a process 800C, according to aspects of the disclosure.

At step 832, the configuration manager 105 displays a configuration menu in a first state in which the configuration menu selects a first set of product components. The displayed configuration menu may be the same or similar to the menu 242 (shown in FIGS. 2-3). The first state of the configuration menu may be the same or similar to the state of the menu 242, which is shown in FIG. 2. The first set of product components may be the same as the set C1, which is shown in FIG. 2. (E.g., C1={Core i5, 8 GB RAM, 3 TB NVME}, etc.)

At step 834, the configuration manager 105, outputs an identifier of a first product that includes the first set of product components. The first product may be the same or similar to product S1. The identifier of the first product according to the present example includes a stock ID for the first product. However, the identifier of the first product may also include one or more of name of the first product, name of the manufacturer of the product, model number of the first product, and/or any other data item that could be used to identify the first product. In addition, in some implementations, the configuration manager 105 may also display the price of the first product, an indication of the stock availability of the first product, and the shipping date of the first product. In some implementations, the identifier of the first product may be displayed inside a user interface component, such as the field 240, as discussed above with respect to FIGS. 2-3.

At step 836, the configuration manager 105 detects a user input to the product configuration menu, which transitions the product configuration menu from a first state to a second state, in which the configuration menu selects a second set of components. In some implementations, the second set of components may be the same or similar to the set C2, which is shown in FIG. 3 (E.g., C2={Core i5, 32 GB RAM, 3 TB NVME}, etc.) The user input may include a touch, a mouse click, and/or any other suitable type of user input. The user input may be the same or similar to the user input 304, which is discussed above with respect to FIG. 3. The user input may define the second set of components by selecting one or more components that are to replace components that are part of the first set. The selection may be made via one or more submenus that are part of the product selection menu (output at step 832).

At step 838, the configuration manager 105 identifies a second product that includes the second set of components (identified at step 836). The second product may be identified by using a product distance data structure. The product distance data structure may include any suitable type of data structure that identifies a distance between the first product (whose identifier is output at step 834) and one or more other products. In some implementations, the second product may be the same or similar to product D5, which is discussed above with respect to FIG. 5. In some implementations, step 838 may be performed in accordance with a process 800D, which is discussed further below with respect to FIG. 8D.

At step 840, the configuration manager 105, outputs an identifier of the second product. The second product may be the same or similar to product D5. The identifier of the second product according to the present example includes a stock ID for the second product. However, the identifier of the second product may also include one or more of name of the second product, name of the manufacturer of the product, model number of the second product, and/or any other data item that could be used to identify the second product. In addition, in some implementations, the configuration manager 105 may also display the price of the second product, an indication of the stock availability of the second product, and the shipping date of the second product. In some implementations, the identifier of the second product may be displayed inside a user component, such as the field 240, which is discussed above with respect to FIGS. 2-3.

Although the process 800C is performed by the configuration manager 105, the present disclosure is not limited to any specific type of entity (or a set of entities) performing the process 800C. The phrase "output a product configuration menu" may refer to any action that is performed by the configuration manager 105 and/or a component of the hosting system 104, which causes a client device to display the configuration menu. The phrase "detecting user input selecting a second set of components" may refer to one or ore of "receiving an indication of a component that is found in the second set, but not in the first", "receiving an indication of the second set of components", receiving a message indicating that the user input is performed, etc. The phrase "outputting an identifier of a second component" may refer to transmitting the identifier to a client device and/or taking any other action that would cause the client device to display (or otherwise output) the component.

Figure 8D:
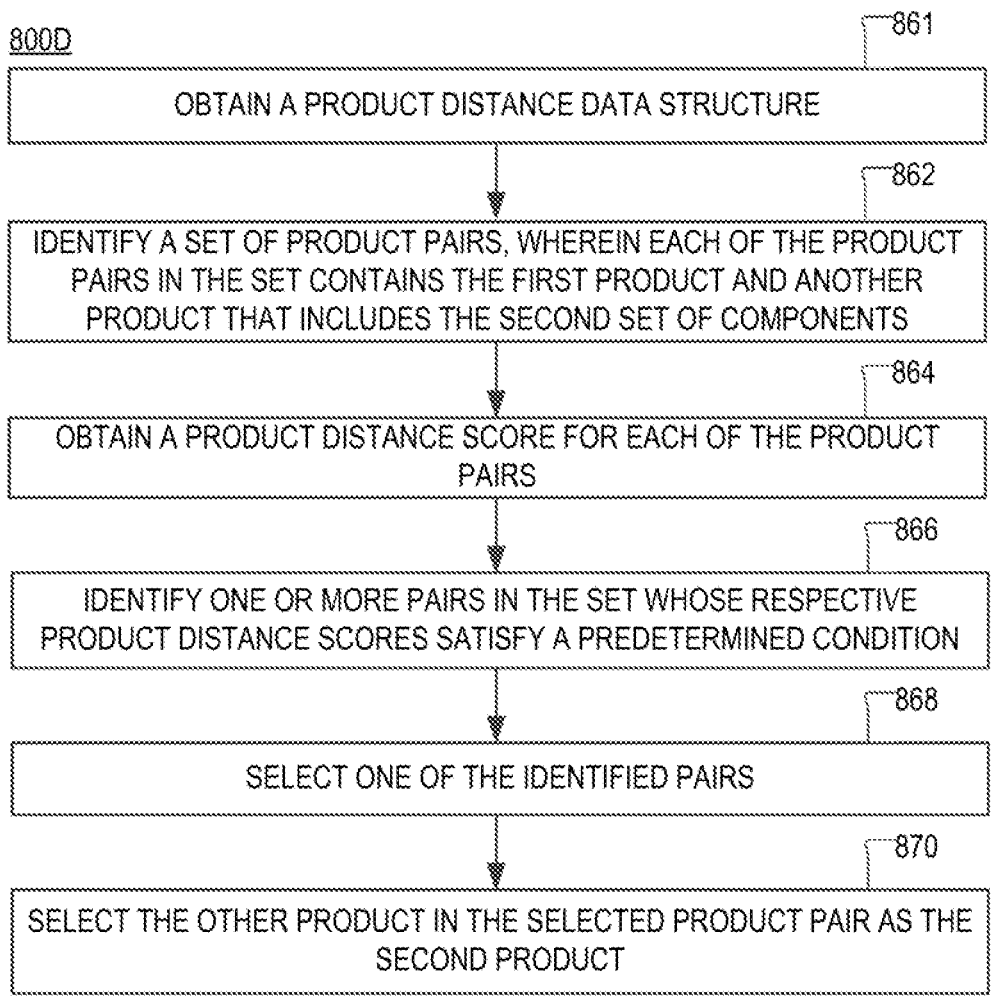
FIG. 8D is a flowchart of an example of a process, according to aspects of the disclosure.

FIG. 8D is a flowchart of an example of a process 800D for identifying a second product that includes a second set of components, as specified by step 838 of the process 800C.

At step 861, the configuration manager 105 obtains a product distance data structure. According to the present example, the configuration manager 105 obtains a product distance matrix, such as the product distance matrix 442. However, alternative implementations are possible in which the configuration manager 105 obtains a stock graph, such as the stock graph 444.

At step 862, the configuration manager 105 identifies a set of product pairs. Each of the product pairs in the set includes the first product (whose identifier is output at step 834) and another product that includes the second set of product components (i.e., the set specified by the user input detected at step 836). The "other product" in each pair is herein referred to as a "compared product," because it is being compared to the first product. Each pair may include a different "compared product."

At step 864, the configuration manager 105 obtains a respective product distance score for each of the pairs in the set. Obtaining the score may include retrieving the score from the product distance data structure (i.e., retrieving the score from a product distance matrix). Alternatively, obtaining the score may include calculating the score by using the product distance data structure (e.g., calculating the score based on information contained in a stock graph). As a result of executing step 864, the configuration manager 105 obtains a plurality of product distance scores, wherein each product distance score corresponds to a different one of the product pairs (identified at step 862).

At step 866, the configuration manager 105 identifies one or more pairs whose product distance scores satisfy a predetermined condition. For example, the configuration manager may identify the product pair having the largest product distance score in the plurality of product distance scores. According to the present example, the larger the product distance score is for two products, the more similar the two products are to one another.

At step 868, the configuration manager 105 selects one of the pairs identified at step 866. In instances in which the configuration manager 105 has identified only one pair at step 866, the configuration manager may select this pair. In instances in which there is a tie for the largest product distance score between two or more pairs, the configuration manager 105 may use any suitable type of mechanism for breaking the tie. For example, the configuration manager 105 may select the product with the lowest price, the product with the lowest shipping cost, or the product with the earliest shipping date, provided that these attributes are not already weighted into the product distance scores.

At step 870, the configuration manager 105 selects the compared product that is part of the selected product pair as the "second product." It will be recalled that the second product is one whose identifier is output in response to the user input (detected at step 836) which changes the set of components that are specified by the user.

Figure 9:
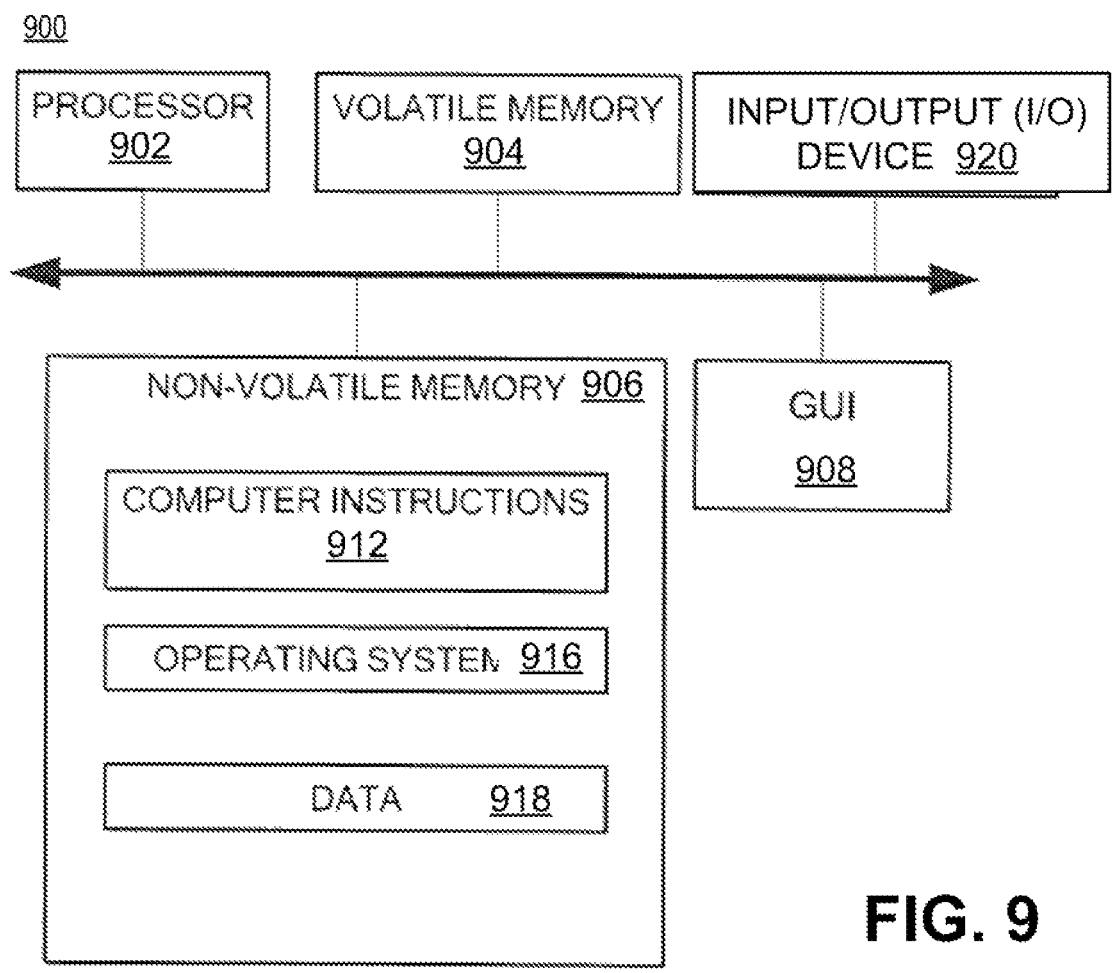
FIG. 9 is a diagram of an example of a computing device, according to aspects of the disclosure.

Referring to FIG. 9, computing device 900 may include processor 902, volatile memory 904 (e.g., RAM), non-volatile memory 906 (e.g., a hard disk drive, a solid-state drive such as a flash drive, a hybrid magnetic and solid-state drive, etc.), graphical user interface (GUI) 908 (e.g., a touchscreen, a display, and so forth) and input/output (110) device 920 (e.g., a mouse, a keyboard, etc.). Non-volatile memory 906 stores computer instructions 912, an operating system 916 and data 918 such that, for example, the computer instructions 912 are executed by the processor 902 out of volatile memory 904. Program code may be applied to data entered using an input device of GUI 908 or received from 110 device 920.

Processor 902 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

FIGS. 1-9 are provided as an example only. At least some of the steps discussed with respect to FIGS. 1-9 can be performed in parallel, in a different order, or altogether omitted.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary.*. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a computing system, comprising:
   outputting, by the computing system, a product configuration menu that specifies a first set of product components;
   outputting, by the computing system, information associated with a first product, the first product including the first set of product components;
   detecting, by the computing system, a user input that specifies a second set of product components, the user input being received via the product configuration menu, the user input replacing at least one of the product components in the first set with a different product component;
   selecting, by the computing system, a second product that includes the second set of product components, the second product being selected by: (i) using a product distance data structure to identify a plurality of candidate products that include the second set of product components and obtain a respective product distance score for the first product and each of the plurality of candidate products, and (ii) selecting one of the candidate products as the second product based on the respective product distance scores; and outputting, by the computing system, information associated with the second product, wherein the product distance data structure includes a plurality of first nodes, a plurality of second nodes, and a plurality of edges, each of the first nodes corresponding to a different one of a plurality of products, each of the second nodes corresponding to a different one of a plurality of product components, each of the edges extending between a respective one of the plurality of first nodes and a respective one of the plurality of second nodes and indicating an is-part-of relationship between the one of the plurality of product components that corresponds to the respective second node and the one of the plurality of products that corresponds to the respective first node, the is-part-of relationship being a relationship whereby the one of the plurality of product components that corresponds to the respective second node is a component that is found in the one of the plurality of products that corresponds to the respective first node.

2. The method of claim 1, wherein the product distance score for the first product and any given one of the plurality of candidate products is determined based on a Jaccard similarity between a first plurality of components that are part of the first product and a second plurality of components that are part of the given candidate product, the first plurality of components being a strict superset of the first set of components, and the second plurality of components being a strict superset of the second set of components.

3. The method of claim 1, wherein the product distance score for the first product and any given one of the plurality of candidate products is determined based on a difference between a first plurality of components that are part of the first product and a second plurality of components that are part of the given candidate product, the first plurality of components being a strict superset of the first set of components, and the second plurality of components being a strict superset of the second set of components.

4. The method of claim 1, wherein the product distance score for the first product and any given one of the plurality of candidate products is determined based on a difference between a first plurality of components that are part of the first product and a second plurality of components that are part of the given candidate product.

5. The method of claim 1, wherein the respective product distance score for the first product and any given one of the plurality of candidate products is based on a difference between a shipping cost that is associated with the first product and a shipping cost that is associated with the given one of the plurality of products.

6. The method of claim 1, wherein the respective product distance score for the first product and any given one of the plurality of candidate products is calculated based on a difference between a price of the first product and a price of the given one of the plurality of products.

7. A system, comprising:
a memory; and
one or more processors that are operatively coupled to the memory, the one or more processors being configured to perform the operations of:

outputting a product configuration menu that specifies a first set of product components;

outputting information associated with a first product, the first product including the first set of product components;

detecting a user input that specifies a second set of product components, the user input being received via the product configuration menu, the user input replacing at least one of the product components in the first set with a different product component;

selecting a second product that includes the second set of product components, the second product being selected by: (i) using a product distance data structure to identify a plurality of candidate products that include the second set of product components and obtain a respective product distance score for the first product and each of the plurality of candidate products, and (ii) selecting one of the candidate products as the second product based on the respective product distance scores; and outputting information associated with the second product, wherein the product distance data structure includes a plurality of first nodes, a plurality of second nodes, and a plurality of edges, each of the first nodes corresponding to a different one of a plurality of products, each of the second nodes corresponding to a different one of a plurality of product components, each of the edges extending between a respective one of the plurality of first nodes and a respective one of the plurality of second nodes and indicating an is-part-of relationship between the one of the plurality of product components that corresponds to the respective second node and the one of the plurality of products that corresponds to the respective first node, the is-part-of relationship being a relationship whereby the one of the plurality of product components that corresponds to the respective second node is a component that is found in the one of the plurality of products that corresponds to the respective first node.

8. The system of claim 7, wherein the product distance score for the first product and any given one of the plurality of candidate products is determined based on a Jaccard similarity between a first plurality of components that are part of the first product and a second plurality of components that are part of the given candidate product, the first plurality of components being a strict superset of the first set of components, and the second plurality of components being a strict superset of the second set of components.

9. The method of claim 7, wherein the product distance score for the first product and any given one of the plurality of candidate products is determined based on a difference between a first plurality of components that are part of the first product and a second plurality of components that are part of the given candidate product, the first plurality of components being a strict superset of the first set of components, and the second plurality of components being a strict superset of the second set of components.

10. The system of claim 7, wherein the product distance score for the first product and any given one of the plurality of candidate products is determined based on a difference between a first plurality of components that are part of the first product and a second plurality of components that are part of the given candidate product.

11. The system of claim 7, wherein the respective product distance score for the first product and any given one of the plurality of candidate products is based on a difference between a shipping cost that is associated with the first product and a shipping cost that is associated with the given one of the plurality of products.

12. The system of claim 7, wherein the respective product distance score for the first product and any given one of the plurality of candidate products is calculated based on a difference between a price of the first product and a price of the given one of the plurality of products.

13. A non-transitory computer-readable medium storing one or more processor-executable instructions, which, when executed by at least one processor, cause the at least one processor to perform the operations of:
  outputting, by the computing system, a product configuration menu that specifies a first set of product components;
  outputting, by the computing system, information associated with a first product, the first product including the first set of product components;
  detecting, by the computing system, a user input that specifies a second set of product components, the user input being received via the product configuration menu, the user input replacing at least one of the product components in the first set with a different product component;
  selecting, by the computing system, a second product that includes the second set of product components, the second product being selected by: (i) using a product distance data structure to identify a plurality of candidate products that include the second set of product components and obtain a respective product distance score for the first product and each of the plurality of candidate products, and (ii) selecting one of the candidate products as the second product based on the respective product distance scores; and
  outputting, by the computing system, information associated with the second product,
  wherein the product distance data structure includes a plurality of first nodes, a plurality of second nodes, and a plurality of edges, each of the first nodes corresponding to a different one of a plurality of products, each of the second nodes corresponding to a different one of a plurality of product components, each of the edges extending between a respective one of the plurality of first nodes and a respective one of the plurality of second nodes and indicating an is-part-of relationship between the one of the plurality of product components that corresponds to the respective second node and the one of the plurality of products that corresponds to the respective first node, the is-part-of relationship being a relationship whereby the one of the plurality of product components that corresponds to the respective second node is a component that is found in the one of the plurality of products that corresponds to the respective first node.

14. The non-transitory computer-readable medium of claim 13, wherein the product distance score for the first product and any given one of the plurality of candidate products is determined based on a Jaccard similarity between a first plurality of components that are part of the first product and a second plurality of components that are part of the given candidate product, the first plurality of components being a strict superset of the first set of components, and the second plurality of components being a strict superset of the second set of components.

15. The non-transitory computer-readable medium of claim 13, wherein the product distance score for the first product and any given one of the plurality of candidate products is determined based on a difference between a first plurality of components that are part of the first product and a second plurality of components that are part of the given candidate product, the first plurality of components being a strict superset of the first set of components, and the second plurality of components being a strict superset of the second set of components.

16. The non-transitory computer-readable medium of claim 13, wherein the product distance score for the first product and any given one of the plurality of candidate products is determined based on a difference between a first plurality of components that are part of the first product and a second plurality of components that are part of the given candidate product.

17. The non-transitory computer-readable medium of claim 13, wherein the respective product distance score for the first product and any given one of the plurality of candidate products is based on a difference between a shipping cost that is associated with the first product and a shipping cost that is associated with the given one of the plurality of products.

18. The non-transitory computer-readable medium of claim 13, wherein the respective product distance score for the first product and any given one of the plurality of candidate products is calculated based on a difference between a price of the first product and a price of the given one of the plurality of products.

* * * * *